United States Patent Office 3,204,988
Patented Sept. 7, 1965

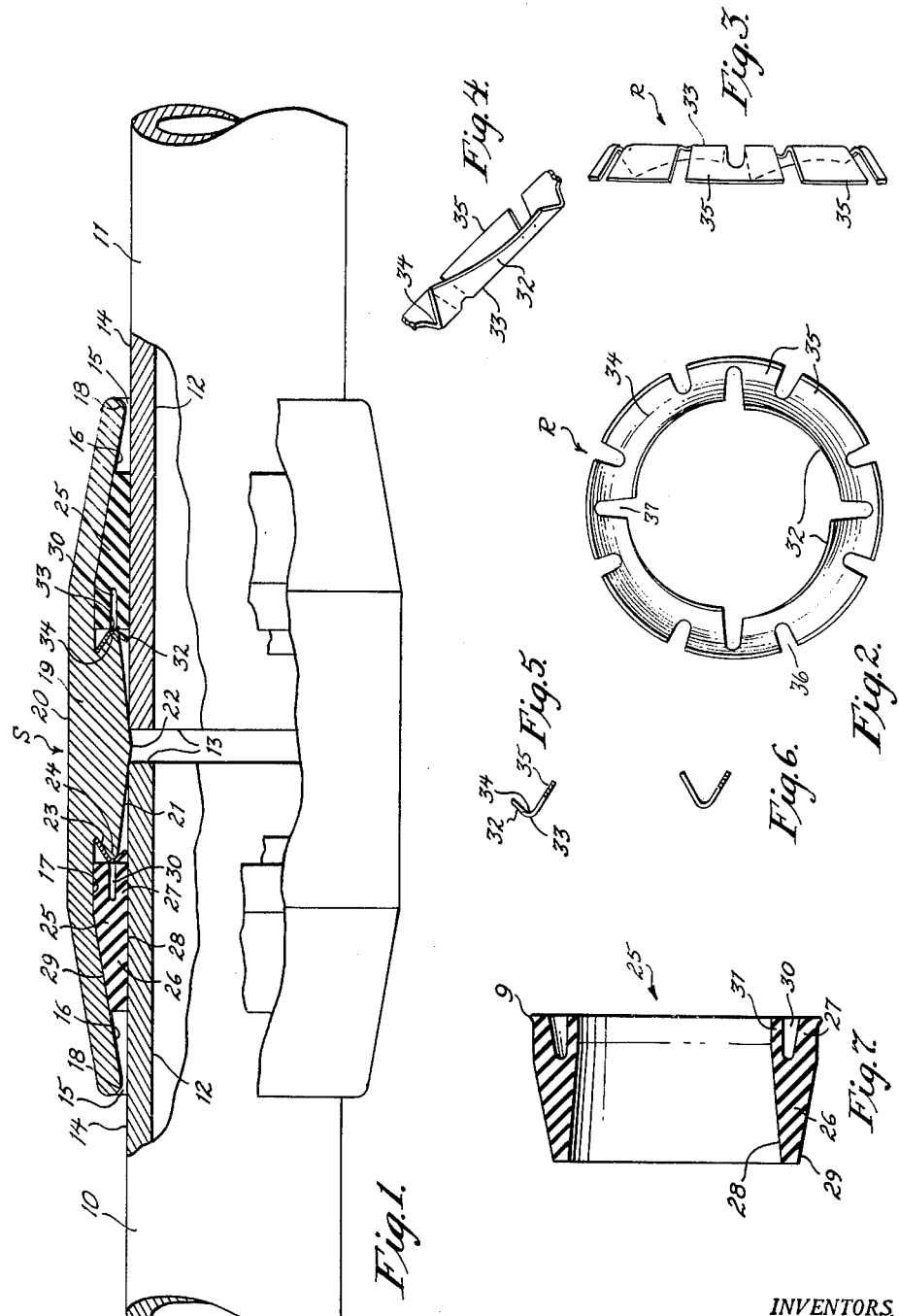

3,204,988
STAB TYPE PIPE COUPLING WITH GASKET BACK UP RING
Lawrence R. Ouderkirk, Olean, N.Y., and John T. Dunton, Bradford, Pa., assignors to Dresser Industries, Inc., Dallas, Tex., a corporation of Delaware
Filed May 18, 1960, Ser. No. 30,007
3 Claims. (Cl. 285—40)

The present invention relates to pipe couplings of the so called "Stab Type" and is concerned primarily with the provision of certain improvements involving the use of spring back up rings to prevent walking of the gaskets on the pipe ends. The type of coupling which is intended to be improved by this invention is illustrated and described in the co-pending application of Francis G. Fabian, Jr., Serial No. 815,078, filed May 22, 1959 and entitled "Pipe Coupling," now Patent No. 3,127,196 entitled "Wedged Gasket Coupling Utilizing Differential Coefficients of Friction.

In the above identified co-pending application there is disclosed a pipe joint consisting essentially of two plain pipe ends, a coupling sleeve having tapered end portions, and gaskets received in said tapered end portions and disposed about the pipe. The gaskets are designed so that the coefficient of friction between the engaging surfaces of the pipe ends and gaskets is three or four times as great as the coefficient of friction between the engaging surfaces of the gaskets and the tapered sleeve surfaces. Thus, any outward pull on the pipe ends tending to pull them from the coupling sleeve will cause compression of the gaskets to resist such removal.

It has been found in actual practice that repeated stresses which are created on the pipe ends tending to pull the ends from the coupling sleeve causes a walking of the gaskets toward the free ends of the pipe. Thus, after continued use, there is great danger of the pipe ends being pulled free of the gaskets.

With the foregoing condition in mind, the present invention has in view as its foremost objective the provision of a pipe coupling of the type aforesaid which includes a back up ring for each gasket which resists and prevents movement of the gasket toward the free end of the pipe.

More in detail, the invention has as an object the provision, in a coupling of the character noted, a gasket back up ring which takes the form of an annular leaf spring which is fashioned to provide an inner series of sections which engage the outer surface of the pipe end, an intermediate interrupted annular rib which engages the end face of the gasket, and an outer series of sections which engage the sleeve. Thus, with the gasket engaging the rib and the fingers engaging the pipe end, and sleeve respectively walking of the gasket on the pipe end is inhibited.

In assembling the back up springs with the coupling, it is important that provision be made for accurately positioning the back up rings in the coupling. Thus, another highly important object in view is to provide, in a pipe coupling of the character indicated, a sleeve which is particularly designed to cooperate with the back up rings in positioning the latter. This end is achieved by forming the medial portion of the coupling with a radially inwardly extending enlargement defined by undercut grooves at each end thereof. These undercut grooves in turn provide annular acute angled shoulders which are adapted to be received in those portions of the back up rings defining the intermediate ribs thereof. With this arrangement, the back up rings may be readily assembled with the coupling member with definite assurance that they will be in proper relation with respect to the gaskets, the walking of which they are intended to prevent.

Another important object is to provide, in a coupling of the character noted, a back up ring having inner pipe engaging sections, the inner edges of which are disposed in a helix or spiral whereby they are screw threads which facilitate positioning of the pipe ends by rotating either the pipe ends or the sleeve, and at the same time insures of a firm gripping of the pipe ends by the fingers.

Still another object in view is to provide, in a coupling of the character indicated, a gasket having a bore that is slightly tapered to facilitate stabbing in of a pipe end and which is distended by such action to provide a large area of surface contact between a gasket and a pipe end.

Various other more detailed objects and advantages of the invention, such as arise in connection with carrying out the above noted ideas in a practical embodiment will in part become apparent and in part be hereinafter stated as the description of the invention proceeds.

The invention, therefore, comprises a pipe joint consisting essentially of two plain pipe ends to be joined, a coupling sleeve having a central enlargement and outwardly tapered surfaces, a gasket having a slightly tapered bore positioned between the outer surface of each pipe end and the corresponding tapered surface of the sleeve, together with a back up ring for each gasket in the form of an annular leaf spring having a series of inner spaced sections engaging the pipe end, an outer series of sections engaging the sleeve and, an intermediate annular rib engaging the inner face of the gasket with the rib providing an annular groove which receives a shoulder on the enlargement of the coupling sleeve to position the spring.

For a full and/or more complete understanding of the invention reference may be had to the following description and accompanying drawing wherein:

FIGURE 1 is a side view, partly in section, and partly in elevation of a pipe joint designed in accordance with the precepts of this invention.

FIGURE 2 is a view, in end elevation of one back up ring;

FIGURE 3 is another elevational view of the back up ring taken normal to the showing of FIGURE 2;

FIGURE 4 is detail of a portion of the back up ring depicting the inner edge which functions as a thread;

FIGURE 5 is a detailed section of one form of ring;

FIGURE 6 is another section through a plane in which the inner and outer sections are of the same length; and FIGURE 7 is a section through the gasket per se.

Referring now to the drawing wherein like reference characters denote corresponding parts and first more particularly to FIGURE 1 two plain pipe ends which are to be joined are designated 10 and 11 respectively. The term "pipe" is herein used in a generic sense to include pipe, tubing, conduits, shafts and like members.

Each of the pipe ends 10 and 11 has an inner cylindrical bore 12, a plain end face 13 and a smooth outer cylindrical surface 14.

A coupling sleeve S is double ended and is symmetrical with respect to a central transverse plane. At each end the sleeve S is restricted to provide a circular pipe receiving aperture 15 having an inside diameter just slightly greater than the outside diameter of the pipe ends 10 and 11, thus, permitting the latter to be freely stabbed into the ends of the sleeve S. Extending inwardly from each aperture 15 is a tapered or truncated conical surface 16 which terminates at a line of joindure with a cylindrical surface 17.

The angular relation of each tapered surface 16 with respect to the axis of the pipe is of the utmost importance and to achieve the best results should be in the nature of ten degrees, although a slight difference either above or below this angularity would still afford good results. It will be noted that each tapered surface 16 blends in with the end face of the sleeve at a rounded corner designated 18. This facilitates stabbing in of the pipe ends.

The sleeve S also includes a central or medial portion 19 defined by an outer cylindrical surface 20 and two conical surfaces 21 which meet at an apex 22. At each end of this enlargement 19 and where the cylindrical surface 17 begins, there is an undercut groove 23 which presents a sharp acute angled annular shoulder 24.

The pipe coupling includes a pair of gaskets 25 with each gasket being received in the space defined by the outer surface 14 of the pipe end, tapered surface 16 and cylindrical surface 17. Each of the gaskets 25 is formed of elastomer material, for example, a natural or synthetic rubber composition. The gasket material is preferably elastic yet firm with a durometer of the order of sixty to eighty having high sheer strength. Preferably, the durometer of the gasket material is approximately sixty eight to seventy three.

As shown in the drawing each gasket 25 includes a wedge shaped portion 26 and a fish-tail part 27. The wedge shaped portion 26 is defined by an inner conical surface or face 28, the angularity of which is in the order of five degrees with respect to its axis, and an outer tapered or conical surface 29. The fish-tail portion 27 has an outer cylindrical surface that engages the cylindrical surface 17 of the sleeve S and is formed with an annular end opening groove 30 which, in effect, defines a flange 31 that is directed angularly inwardly before the pipe ends are stabbed into the gasket. However, this stabbing action results in the flanges 31 being stretched or distended into the cylindrical formation illustrated and in which it grippingly engages the outer surface of the pipe. While the outer surface of the fish tail portion 27 is generally cylindrical at its inner or free end it is formed with a bead 9 to insure of sealing engagement with the surface 17 of the sleeve.

The inner diameter of the wedge shaped portion 26, or rather its tapered bore 28, is approximately equal to the outside diameter of the pipe surface 14 so that the pipe end can be stabbed into the gasket with a minimum of resistance. The inner diameter of the flange 31 of the gasket in free condition is appreciably less than the outside diameter of the pipe. Thus, as the pipe is stabbed into the gasket past the flange 31 the latter is expanded and stretched preferably to a degree of about eight percent so that it grips the pipe to provide an intial fluid tight seal and also a gripping action on the pipe.

In accordance with the present invention, the coefficient of friction between the bore 28 of the gasket 25 and the cylindrical surface 14 of the pipe is materially greater than the coefficient of friction between the outer tapered surface 29 of the gasket and the tapered surface 16 of the sleeve, preferably being at least two times as great. This differential which obtains between the respective coefficients of friction may be obtained by increasing the friction between the gasket and the pipe, decreasing the friction between the gasket and the sleeve or both.

In a preferred embodiment of the invention the surface 16 of each gasket recess is provided with a smooth finish and is covered or coated with a material reducing the coefficient of friction. For example, the surface 16 is covered with a permanent thin layer of a low friction material, for example, tetrafluoroethylene resin, sold commercially under the name of "Teflon." The resin is applied as a water dispersion and then sintered at a temperature on the order of 750° F. Two or more coatings may be applied as desired. Other lower friction materials for coating the surface 16 include fluorochloro carbons such as trifluorochloroethylene sold under the name "Kel-F."

The outer tapered surface 29 of each gasket 25 is preferably also treated to reduce the coefficient of friction. For example, the gasket may be formed with or of a rubber composition, the outer surface of which is halogenated, for example, being treated with bromine. For convenience of manufacture, the entire gasket is subjected to the halogenating treatment and the inner surface 28 is then buffed or polished to remove the halogenated layer. A relatively higher coefficient of friction between the gasket surface 28 and the pipe surface 14 is thereby provided.

Referring now more particularly to FIGURES 2, 3, and 4, a back up ring is therein illustrated and referred to in its entirety by the reference character R. Two of these rings are included in each coupling, there being one ring for each gasket. Each of the rings R, is in effect, a leaf spring that is fashioned from sheet metal as by a stamping operation to provide an annular series of inner sections 32 which engage the pipe surface 14. It will be noted that these fingers 32 are inclined at a fairly sharp angle with respect to the pipe ends so as to tend to bite thereinto. Moreover, the inner edge of each section is formed as a helix or spiral, as illustrated in FIGURE 4, whereby it is constituted a thread that bites into the outer surface of the pipe end. Each of the rings R also includes what is, in effect, an annular rib 33 which is interrupted and which engages the end face of a gasket 25, preferably at the location of the groove 30 therein. This rib 33 is actually defined by an annular recess or groove 34 on the opposite face and which groove or recess 34 receives one of the sharp annular shoulders 24. It will be noted that each ring R also includes a series of angularly inclined outwardly extending sections 35 which are received in the undercut groove 23 and the outer edges of which engage the bore 17 of the sleeve S.

It will be further understood that each back up ring R may be fashioned from a flat annulus of metal by forming the recesses 36 and 37 therein and bending into the angular shape providing the rib 33 and groove 34 and may then be heat treated to impart the required spring properties thereto.

In use the rings R are first assembled in the coupling sleeve S with the grooves or recesses 34 receiving the shoulders 24. This accurately positions the rings and in this position it will be noted the sections 32 are directed axially inwardly of the sleeve. Each of the gaskets is then positioned in its respective gasket receiving recess as defined by the surfaces 16 and 17.

The coupling is now in condition to receive the pipe ends 10 and 11. Each of these pipe ends may then be stabbed in through the respective aperture 15 with the inward movement being limited by one of the inclined surfaces 21 against which the free end of the pipe engages. That is all that is required to complete the coupling. This stabbing action is preferably accompanied by a rotation of the pipe ends or sleeve to develop the threading action of the inner edges of the sections 32.

It is evident that when an outward pull is exerted on one of the pipe ends the differential in friction which obtains between the gasket and the pipe on one hand and the sleeve on the other will cause the gasket to be wedged down and compressed against the pipe. Should stresses on the pipe ends be repeatedly set up and then relieved any tendency of the gaskets to walk on the pipe ends is prevented by the rings R.

It will be noted that each back up ring is compressed between the sleeve and pipe end, thus insuring that the inner edges of the sections 32 bite into the outer surface of the respective pipe end.

While a preferred specification embodiment of the invention is hereinbefore set forth it is clearly to be understood that the invention is not to be limited to the particular constructions, designs, and materials illustrated and described because various modifications of these details may be provided in putting the invention into practice within the purview of the appended claims.

What is claimed is:

1. In a pipe joint, a pair of meeting pipe ends to be joined each having a plain outer cylindrical surface and a free end, a coupling sleeve receiving said pipe ends and having an inner conical surface at each end terminating at its outer end in a pipe receiving aperture, there being an inner cylindrical surface adjacent to and merging in with the larger end of each of said conical surfaces, the outer surface of each pipe end and the adjacent conical and cylindrical surfaces of said sleeve defining a gasket receiving recess, a gasket of a firm elastomer material in each of said recesses, each of said gaskets having an inner bore engaging the respective pipe end, an outer tapered surface engaging the conical surface of the sleeve, and an outer cylindrical surface engaging the cylindrical surface of the sleeve, the coefficient of friction between the bore of the gasket and the outer surface of the pipe being at least two times as great as the coefficient of friction between the engaging tapered and conical surfaces, and a pair of back up rings within said sleeve there being one back up ring between the free end of each pipe end and the gasket thereabout, said back up rings having pipe engaging means and gasket engaging means to prevent walking movement of said gaskets toward the free ends of said pipe ends.

2. The pipe joint called for by claim 1 in which the coupling sleeve has a medial inwardly extending enlargement, the opposite ends of which are formed with an annular pointed shoulder and in which each back up ring is formed with an annular groove receiving one of the shoulders, inclined spring sections engaging the respective pipe end and a rib on the side of said ring opposite to the said groove engaging the respective gasket.

3. The pipe coupling of claim 1 in which each back up ring is formed with a series of inwardly extending inclined sections, the inner edges of which are helically disposed whereby they are constituted threads that bite into the pipe end.

References Cited by the Examiner
UNITED STATES PATENTS

| | | | |
|---|---|---|---|
| 2,017,994 | 10/35 | Spang | 285—375 |
| 2,021,745 | 11/35 | Pfefferle | 285—340 |
| 2,201,372 | 5/40 | Miller | 285—340 |
| 2,209,235 | 7/40 | Nathan | 285—111 |
| 2,215,704 | 9/40 | Ladd | 277—228 |
| 2,226,304 | 12/40 | Dillon | 285—383 |
| 2,484,192 | 10/49 | Squiller | 285—40 |
| 2,571,560 | 10/51 | Gall. | |
| 2,817,562 | 12/57 | Fleming | 277—237 |
| 2,837,353 | 6/58 | Ashbrook | 285—113 |
| 3,127,196 | 3/64 | Fabian et al. | 285—111 |

FOREIGN PATENTS

| | | |
|---|---|---|
| 67,749 | 4/41 | Norway. |
| 863,881 | 12/52 | Germany. |

CARL W. TOMLIN, *Primary Examiner.*